United States Patent [19]

Grasset

[11] Patent Number: 5,028,179
[45] Date of Patent: Jul. 2, 1991

[54] CHAMFERING MACHINE

[75] Inventor: Michel J. V. Grasset, Guerande, France

[73] Assignee: Aerospatiale Societe Nationale Industrielle, Paris, France

[21] Appl. No.: 392,916

[22] PCT Filed: Sep. 7, 1988

[86] PCT No.: PCT/FR88/00440
§ 371 Date: Jun. 20, 1989
§ 102(e) Date: Jun. 20, 1989

[87] PCT Pub. No.: WO89/02329
PCT Pub. Date: Mar. 23, 1989

[30] Foreign Application Priority Data
Sep. 8, 1987 [FR] France .................. 87 12433

[51] Int. Cl.[5] .............................. B23C 3/12
[52] U.S. Cl. .............. 409/180; 144/134 D; 409/138; 409/178; 409/204
[58] Field of Search .......... 409/138, 178, 182, 204, 409/211, 180; 144/134 D, 117 B

[56] References Cited

U.S. PATENT DOCUMENTS

| | | | |
|---|---|---|---|
| 3,212,541 | 10/1965 | Burrows et al. | 144/134 D |
| 3,517,712 | 6/1970 | Selowitz | 409/178 |
| 3,893,372 | 7/1975 | Strakeljahn | 409/178 |
| 4,417,835 | 11/1983 | Lund | 144/117 B |
| 4,674,548 | 6/1987 | Mills et al. | 409/182 |
| 4,977,938 | 12/1990 | Greeson | 409/178 |

FOREIGN PATENT DOCUMENTS
3340466 5/1985 Fed. Rep. of Germany .

Primary Examiner—Daniel W. Howell
Attorney, Agent, or Firm—Martin Smolowitz

[57] ABSTRACT

The machine comprises on a body bearing and rolling devices (5), a guiding arrangement constituted by adjustable claws (11) adapted to bear against the edge of the work piece (30) to be chamfered, and a router (20) including a milling cutter (24) mounted on the body to be pivotable in a plane perpendicular to the edge, the milling cutter (24) being located between the claws (11).

10 Claims, 3 Drawing Sheets

CHAMFERING MACHINE

The present invention relates to machines for chamfering sheets, plates or panels.

Generally, these chamfering machines comprise means for bearing on the surface of the work piece and for guiding against the edge to be chamfered.

Different models of chamfering machines are known at the present time among which some are light but permit neither the formation of the chamfer on non-rectilinear edges nor the adjustment of the angle of the chamfer which is in most cases fixed at 45°.

In another heavier model of a chamfering machine which operates by planing, the angle of the chamfer can only be modified by changing the tool; moreover, the state of the surface after planing is unsatisfactory, which is unacceptable in the field of aeronautic construction.

An object of the invention is to overcome the drawbacks of conventional chamfering machines.

The invention therefore provides a machine for chamfering sheets, plates or panels comprising a body including means for guiding along the edge of the work piece to be chamfered, said machine further comprising on the body bearing and rolling means, the guiding means being constituted by adjustable claws adapted to bear against the edge of the work piece to be chamfered, and a router including a milling cutter mounted on the body to be pivotable in a plane perpendicular to said edge, said milling cutter being located between said claws.

According to one embodiment, said bearing and rolling means are constituted by two pairs of rollers which project from a side of the body and together define a plane.

According to another feature of the invention, the machine comprises an elongated element mounted in the body to be longitudinally slidable between spindles of said pairs of rollers in a direction parallel to said spindles, and said claws are formed at one end of said element.

Advantageously, said element is connected to an adjusting device comprising a screw engaged with the body and carrying a control knob.

According to an embodiment, two trunnions are provided which are fixed on sides of the body on each side of said slidable element carrying the claws and define the router pivot axis which is perpendicular to said element.

Advantageously, the router is fixed between two side walls each defining an opening through which a respective one of said trunnions extends.

According to another embodiment, the body is adapted to straddle the edge of the work piece to be chamfered and comprises for this purpose a slot which extends in a direction parallel to said plane and into which slot said rollers project, said slot extending a little beyond said claws.

Preferably, the machine comprises means for indexing the angular position of the router relative to the body.

These indexing means are formed by apertures arranged along at least one arc of a circle in a side wall, by at least one aperture in the adjacent wall of the body and by a pin which is capable of being inserted in one of the apertures of the side wall and body.

When the body is adapted to straddle the edge of the work piece to be chamfered, it comprises a roller which is mounted in the body to be slidably adjustable in a direction perpendicular to said slot and is in opposed relation to said pairs of rollers.

The following description, with reference to the accompanying drawings given as non-limitative examples, will explain how the invention may be carried out.

Figure 1:
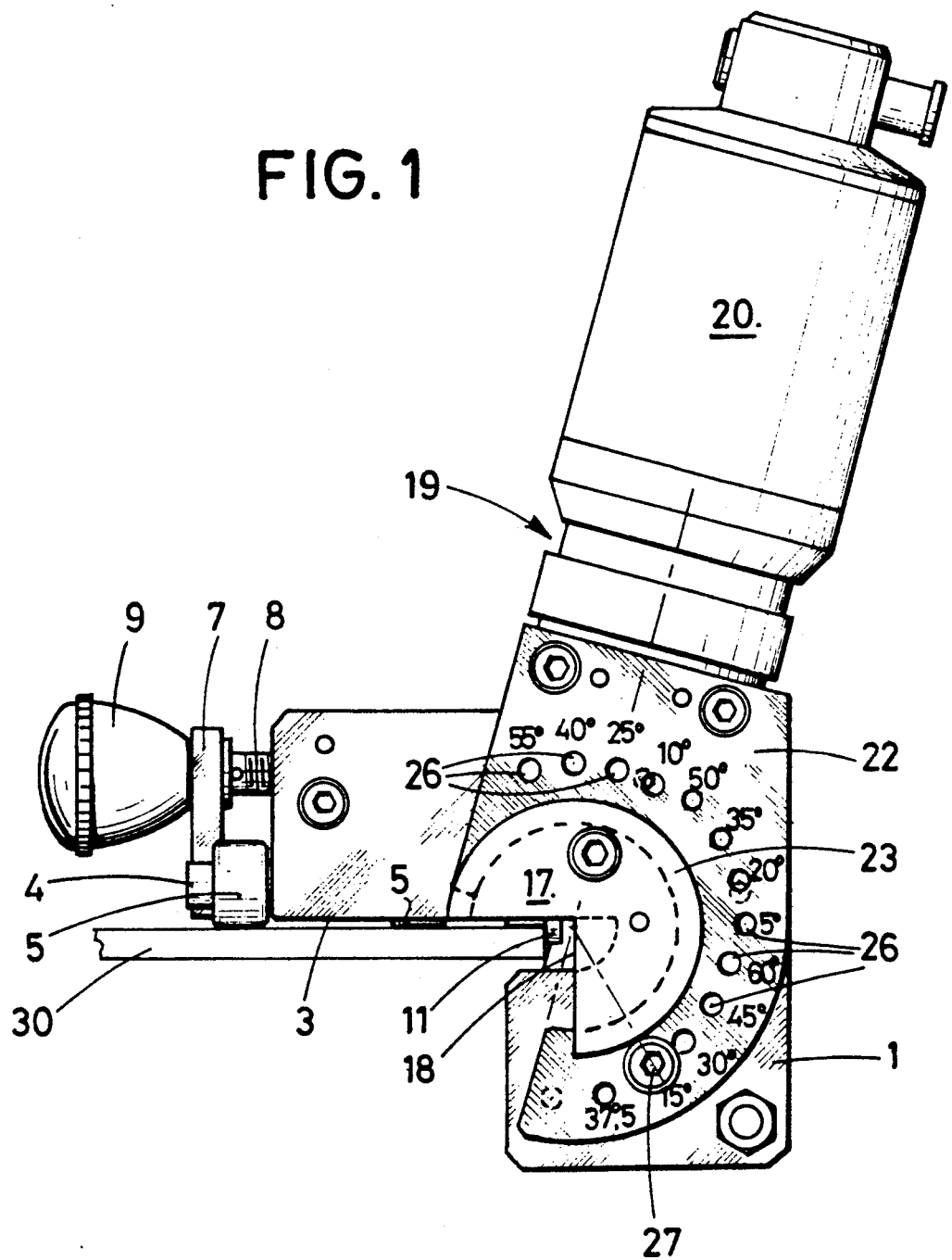
FIG. 1 is a side elevational view of an embodiment of a chamfering machine according to the invention.
Figure 2:
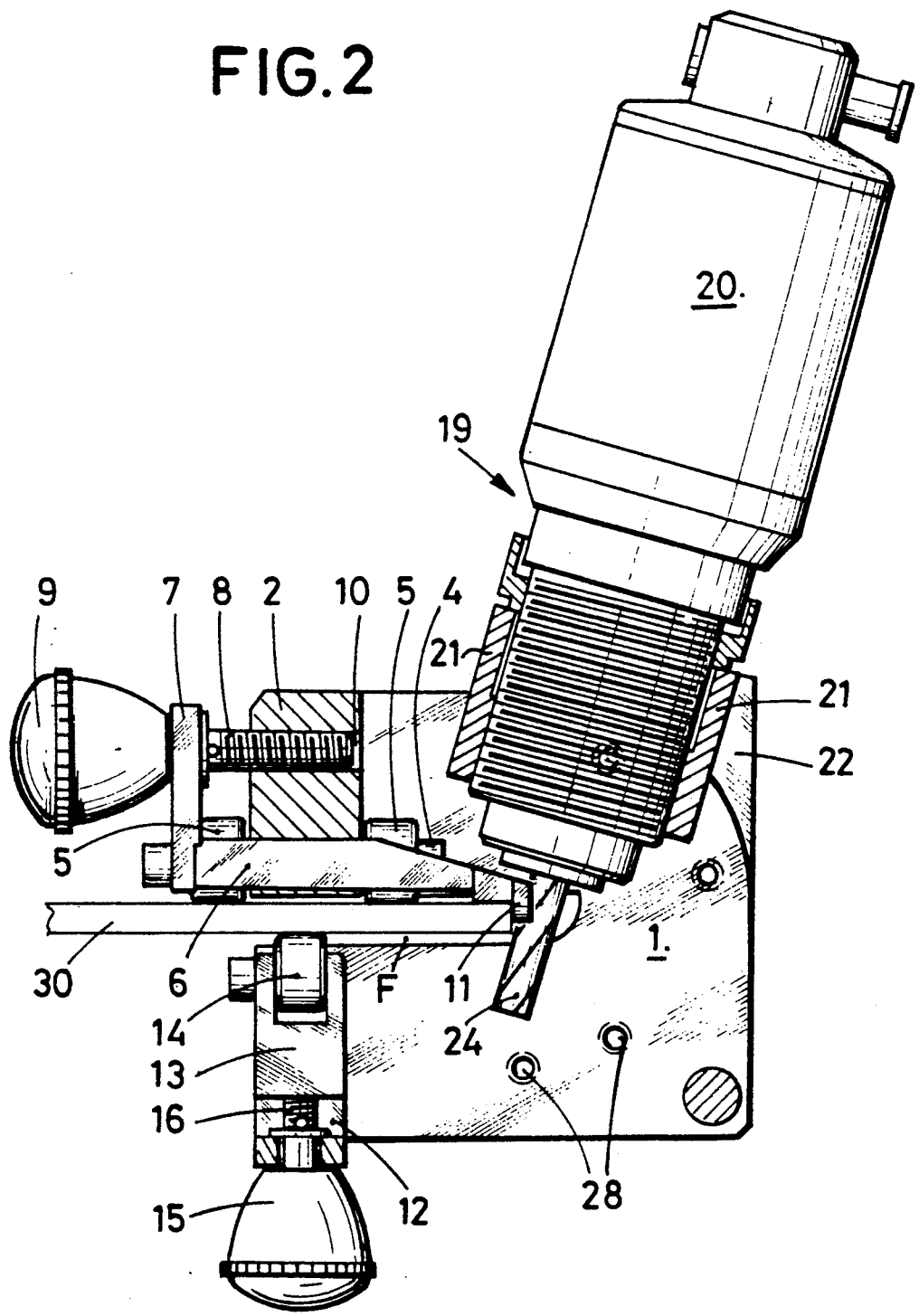
FIG. 2 is a view similar to FIG. 1, partly in section, of a second embodiment of a chamfering machine according to the invention.
Figure 3:
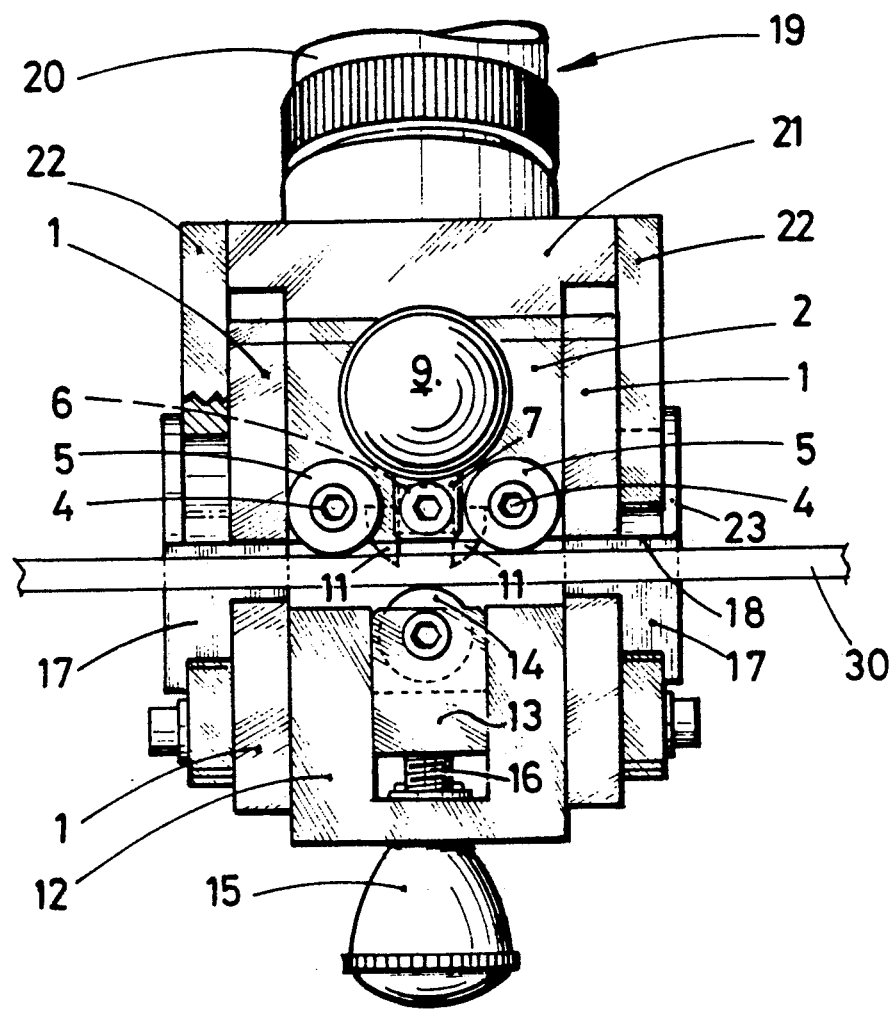
FIG. 3 is a partial front view of the second embodiment.

The embodiments shown in FIGS. 1, 2 and 3 comprise identical components designated by the same reference characters.

With reference to the drawings, the chamfering machine according to one embodiment of the invention comprises a body having two parallel lateral walls 1.

The two wall elements 1 are interconnected by a brace 2 (see FIG. 2) in which are mounted two spaced-apart spindles 4 which are parallel to the walls 1 and carry at each end a roller 5 which projects slightly beyond the edge 3 of the body, these rollers together defining a plane.

Provided in the brace 2 between the spindles 4 and substantially at the level of the latter is an aperture which extends in a direction parallel to the spindles 4 and in which is slidably mounted a finger member 6 having one end which is outside the body and is rigidly connected to a perpendicular plate 7; in which plate is freely rotatively mounted a screw-threaded rod 8 secured to a knob 9, this rod 8 being screw-threadedly engaged in a tapped hole in the brace 2 (see FIG. 2).

The opposite end of the finger member 6 forms two claws 11 disposed at a right angle, spaced apart and also projecting from the edge 3 of the body, but beyond said plane defined by the rollers 5.

With this arrangement, the finger member 6 can be shifted forwardly or rearwardly in the body by turning the knob 9 in one direction or the other.

Each wall element 1 further carries a trunnion fixed on its outer side and constituted by a circular plate 17 having a notch 18 defined by two radii at 90°, these elements being fixed in such manner that one of the radii is aligned with the edge 3 of the body, the other radius at a right angle extending transversely beyond the edge 3.

A unit 19 comprising a router 20 is mounted on the body described hereinbefore to be pivotable about the trunnions 17.

The router 20 is mounted on a support element, for example a screw-threaded sleeve 21 as shown in FIG. 2 on each side of which are fixed two parallel side walls 22 each defining a semi-circular opening having a diameter equal to the diameter of the trunnions 17 and surrounding the latter on about three-quarters of their circumference.

Advantageously, the side walls 22 are maintained against the wall elements 1 by a peripheral radial flange 23 formed on the trunnions 17, and the arrangement is such that the milling cutter 24 of the router 20, located on the axis of the latter, extends between the claws and beyond the edge 3 of the body.

With this arrangement, the unit 19 can take up different angular positions by turning on the trunnions 17 and, in order to immobilize this unit, there are advantageously provided a series of apertures 26 arranged along one or more arcs of a circle in one of the side walls 22 around the trunnion and one or more apertures 28 in the corresponding wall element 1, a detachable pin 27 being engaged in one of the apertures 26 and in an aperture 28 in the wall 1, thereby permitting an indexing of the position of the unit 19 which is facilitated by the indication of the value of the milling angle alongside each aperture 26.

Another embodiment of the invention is shown in FIG. 2 in which the body of the machine is intended to straddle the machine to be chamfered.

For this purpose, the walls 1 define a slot F which extends in a direction parallel to the plane defined by the rollers, the latter projecting into this slot.

On the other side of this slot, the two elements 1 are interconnected by means of a block 12 constituted by a yoke in which is slidable a support 13 carrying a roller 14 whose position may be adjusted by means of a knob 15 secured to a screw-threaded rod 16 screw-threadedly engaged in the block 12.

It will be understood that by adjusting the position of the roller 14 by means of the screw 15 and the knob 16, the width of the gap between this roller and the plane defined by the rollers 5 can be adapted to the thickness of a work piece 30 to be chamfered on the edge of which the machine according to the invention is engaged, the rolling thereof on the work piece being stabilized by the simultaneous action of the rollers 5 and 14 on both sides of the work piece.

It will also be understood that, when the machine is engaged in a position straddling the work piece, the edge of the latter comes in contact with the claws 11.

Consequently, by turning the screw 8 by means of the knob 9, these claws may be shifted forwardly or rearwardly so that it is possible to adjust the position of the milling cutter 24 relative to the edge of the work piece and in this way the dimension of the chamfer which is commenced by a profile milling on the side of the edge to be chamfered and by rolling the machine along the work piece, the machine being guided by the claws 11 which slide along the edge.

It will be observed that, in the embodiment shown in FIG. 1, the thickness of the work pieces to be chamfered is substantially only limited by the capacity of the router.

The machine according to invention is light and consequently easy to handle. As the milling cutter of the router is completely surrounded, the machine is also very safe to use. This machine permits forming chamfers having a V,X,K, or Y shape with angles adjustable between 0° and 60°.

I claim:

1. A machine for chamfering sheets, plates or panels, said machine comprising a body including means for guiding along an edge of a work piece to be chamfered, bearing and rolling means on the body, the guiding means comprising adjustable claws for bearing against the edge of the work piece, and a router including a milling cutter mounted on the body in such manner as to be pivotable in a plane perpendicular to said edge, said milling cutter being located between said claws.

2. The machine according to claim 1, wherein said bearing and rolling means comprise two pairs of rollers which project from a side of the body and together define a plane.

3. The machine according to claim 2, comprising spindles for said pairs of rollers, an elongated element which is mounted to be longitudinally slidable in the body between said spindles in a direction parallel to said spindles, said claws being provided at one end of said element.

4. The machine according to claim 3, comprising an adjusting device connected to said element and comprising a screw screw-threadedly engaged with the body, and a control knob carried by said screw.

5. The machine according to claim 3, comprising two trunnions fixed to sides of the body on each side of said slidable element and defining a router pivot axis which is perpendicular to said element.

6. The machine according to claim 5, comprising two side walls, the router being fixed between said two side walls, each of which side walls defining an opening through which opening a respective one of said trunnions extends.

7. The machine according to claim 1, wherein the body is adapted to straddle the edge of the work piece to be chamfered and includes for this purpose a slot which extends in a direction parallel to said plane and into which slot said rollers extend, said slot extending beyond said claws.

8. The machine according to claim 1, comprising means for indexing the angular position of the router relative to the body.

9. The machine according to claim 8, wherein said indexing means comprise a side wall, apertures arranged along at least one arc of a circle in said side wall, at least one aperture in an adjacent wall of the body, and a pin capable of being inserted in one of the apertures of the side wall and of the body.

10. The machine according to claim 7, further comprising a roller which is mounted in the body to be slidably adjustable in a direction perpendicular to said slot in opposed relation to said rollers.

* * * * *